Sept. 28, 1965   L. W. PROCHNOW   3,208,343
ARTICULATED REAR VIEW MIRRORS FOR A TRACTOR-TRAILER
Filed May 15, 1962   5 Sheets-Sheet 1

INVENTOR.
LEROY W. PROCHNOW
BY
Attys.

United States Patent Office 3,208,343
Patented Sept. 28, 1965

3,208,343
ARTICULATED REAR VIEW MIRRORS FOR A
TRACTOR-TRAILER
Leroy W. Prochnow, 3429 W. 82nd Place, Chicago, Ill.
Filed May 15, 1962, Ser. No. 194,805
16 Claims. (Cl. 88—86)

The invention relates generally to a rear view mirror structure for vehicles, particularly for tractor and trailer truck combinations and the like.

The conventional type of rear view mirror, in the case of tractor-semi-trailer combinations, is of use substantially only when the tractor and trailer extend in a straight line and thus is of primary value only when the trailer is moved forwardly or is moving straight rearwardly. If the trailer is being turned, particularly while the combine is moving rearwardly, the driver's direct vision not only is blocked at one or both sides of the trailer but the conventional mirrors likewise are at angles which preclude their effective operation. This result is occasioned primarily by the conventional mounting of the rear view mirror on the tractor usually at a point forwardly of the driver's position, which he may adjust to reflect images from each side of the trailer to the driver's location, whereby he may sight into the mirror and along the sides of the trailer.

When a tractor is turned angularly relative to the trailer one or both sides of the trailer is blocked from view. Thus assuming that the tractor extends angularly to the right of the trailer, the position of the driver is shifted inwardly to a point where it is ultimately substantially in line with the longitudinal axis of the trailer, thereby precluding a direct line of sight from the driver's normal location along either side of the trailer. Likewise in such position the left hand rear view mirror will be shifted inwardly to a point where it is inoperative and the right hand mirror will be shifted to an angle relative to the trailer at which it is inoperative unless adjusted for the particular tractor trailer angular relationship then existing.

Likewise if the tractor is turned to the left the position of the driver is shifted outwardly relative to the longitudinal trailer axis until a direct view along the left side of the trailer may be obtained, but in such case the right side of the trailer is obscured and the right hand conventional mirror has moved to a position approximately in line with the longitudinal axis of the trailer and thus inoperative.

In an attempt to alleviate some of the conditions described, adjustable mirrors, either manually remotely controllable or controlled by the position of the front wheels of the tractor have been constructed. However, such constructions whether manually adjustable by the driver or automatically adjustably responsive to changes in the steering mechanism, are of use only in those situations wherein the position of the mirror involved is such that viewing may be accomplished merely by an adjustment of the mirror about a vertical axis.

The present invention therefore has among its objects the production of a novel rear view mirror construction in which the mirrors are so disposed and controlled that a suitable rearward view along the sides of the trailer will be presented to the driver at his normal location when a pronounced angular relationship is established between the tractor and trailer, such adjustment of the mirrors being accomplished automatically, responsive to predetermined relative movement between the tractor and trailer.

Another object of the invention is the production of such rear view trailer structure in which the mirrors thereof are normally disposed in an inoperative position when the relationship of the tractor and trailer is such that the conventional mirrors are adequate, as for example, when the tractor and trailer are aligned, the mirrors being automatically extended to operative position when the tractor-trailer relationship is such as to make use of such mirrors desirable or necessary.

A further object of the invention is the production of such mirror construction which is relatively simple in construction, foolproof in operation and very durable and efficient for the purposes intended.

A further object of the invention is the production of such mirror construction which may be readily mounted on existing trailer bodies with a minimum amount of installation expenditure.

Many other objects and advantages of the present invention will be obvious to those skilled in the art from the disclosure herein given.

In the drawings, wherein like reference characters indicate like or corresponding parts.

The present invention contemplates the utilization of viewing mirrors at opposite sides of the trailer structure, such mirrors being carried by the trailer and being movable laterally outward from normal inoperative positions with all or most of the mirror positioned at the inner side of the planes of the trailer side walls, to extended operative positions whereby the driver within the tractor cab may sight from his driving position into the rear viewing structure along one or both sides of the trailer, depending upon the tractor relationship therewith. These results are obtained by automatic actuation of the mirror assembly in response to changes in the angular relationship between the tractor and connected trailer.

In the particular embodiment of the invention illustrated, such actuation is accomplished through a pivotal member carried by the trailer and operatively connected to the tractor through a suitable lever.

General construction

Referring to the drawings and more particularly to FIGS. 1 through 5, the reference numeral 1 indicates generally a rear view mirror assembly operatively mounted on the front end 2 of a trailer body 3 which is supported at its rear end by suitable running gear including wheels 4 and supported at its front end by a tractor indicated generally by the numeral 5, the latter having a cab 6 which may be provided with a conventional rear view mirror 7 at each side thereof. The trailer 3 is suitably connected with the tractor for pivotal movement about a vertical axis which normally intersects or is disposed adjacent to the axis of the rear wheels of the tractor.

The structure 1 comprises a central body structure 8 from which laterally extend fixed members or arms 9, the body structure being suitably secured to the front wall 2 of the trailer by suitable means such as brackets 11. Slidably carried in the members 9 are mirror supporting arms 12 on which are mounted mirrors 13, the latter being pivotally movable about a vertical axis with respect to the arms 12, whereby the mirrors may be adjusted, as hereinafter described, for proper operation and automatically adjusted in response to angular movements between the tractor and trailer. The mirrors 13 are cooperable with fixed mirrors 14 carried by the trailer body, the mirrors being disposed substantially parallel to the front wall 2 of the trailer and disposed adjacent the side walls thereof.

Movement of the arms 12 and pivotal movement of the mirrors 13 is adapted to be effected by suitable mechanism contained within the body 8 and adapted to be actuated by a pivotal shaft 15 extending downwardly in generally parallel relation to the front wall 2 of the trailer and terminating at its lower end with a normally radially extending actuating lever or arm 16. The actuating shaft 15 may be suitably journaled in members 17 mounted on the front wall of the trailer. The free end of the arm 16 is adapted to be operatively connected to the tractor by suitable means, as for example, a ball and socket connection, the particular embodiment of the invention illustrated employing a ball 18 mounted on the free end of the lever 16 and adapted to be received in a suitable socket 19 mounted on the tractor 5. Any suitable ball and socket connection may be employed and the details thereof form no part of the present invention.

Figure 1:
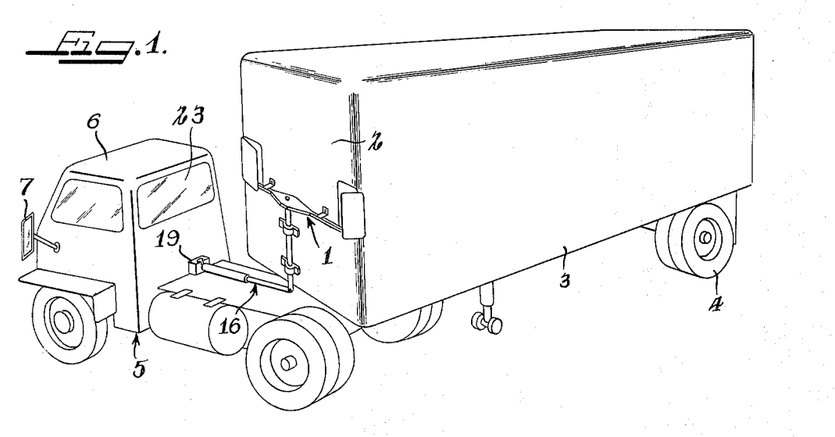
FIG. 1 is a perspective view of a tractor trailer combine illustrating the installation thereon of a rear view mirror structure constructed in accordance with the present invention.
Figure 2:
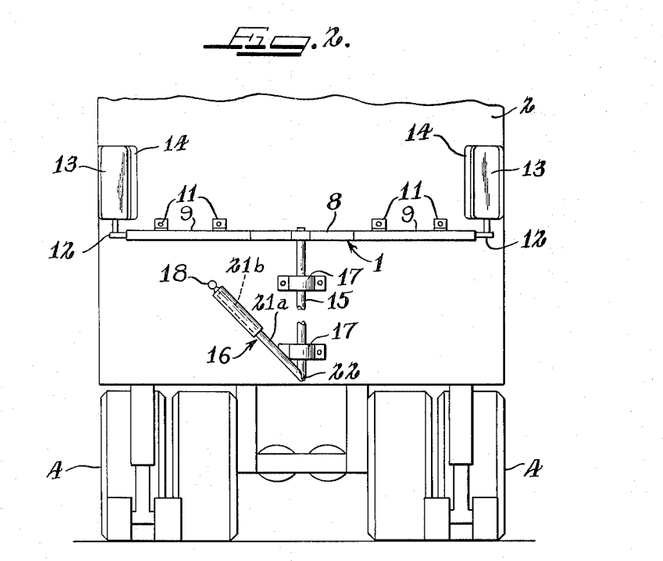
FIG. 2 is an end elevational view of a tractor body illustrating the application of the present invention thereto.

As the pivotal axis of the trailer with respect to the tractor normally will be longitudinally spaced from the axis of the shaft 15, pivotal movement of the trailer relative to the tractor will result in a change in the distance from the axis of the shaft 15 to the effective center of the socket 19, and to compensate therefor the lever 16 preferably is made in two sections 21a and 21b, the two sections being suitably connected for sliding movement therebetween, as for example, a splined connection, with the adjacent end of the section 21a preferably being pivotally connected as indicated at 22 to the adjacent end of the shaft 15, whereby the lever 16 may be rotated upwardly about the axis of the connection 22 to bring the lever adjacent the body of the trailer when the latter is uncoupled from the tractor. In this connection, FIG. 2 illustrates the mirror assembly in its normal inoperative position which it would assume when the tractor and trailer are in aligned relation, while the lever 16 is illustrated partially tilted upwardly about its connection 22 with the shaft 15, the lower portion of which has been rotated to the right out of the normal position it would assume when the mirrors were in the position illustrated in FIG. 2, the lever 16 in such case actually assuming a position normal to the plane of the front wall 2 of the trailer body when the mirrors are in the positions illustrated, as will be apparent from a reference to FIG. 3.

Figure 3:
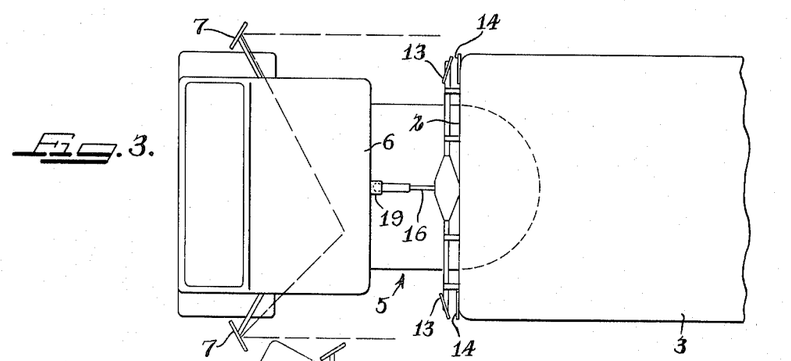
FIGS. 3, 4 and 5 are semi-diagrammatic top plan figures of a tractor and front portion of a connected trailer illustrating the adjustment and operation of the present invention and respectively illustrating the optical relationship when the tractor and trailer are in aligned relationship, when the tractor is turned to the right, and when the tractor is turned to the left.
Figure 4:
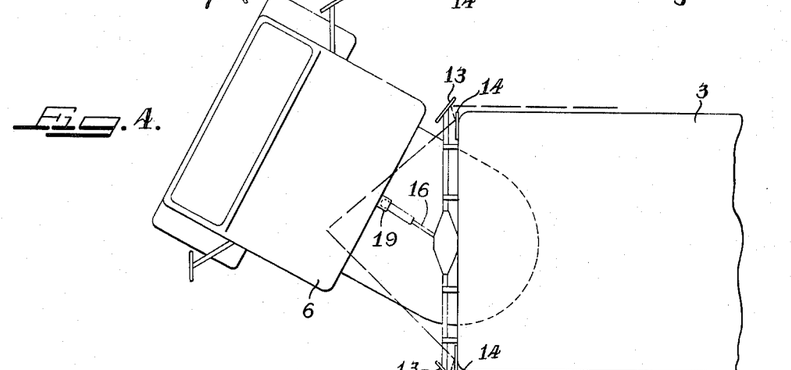
Figure 5:
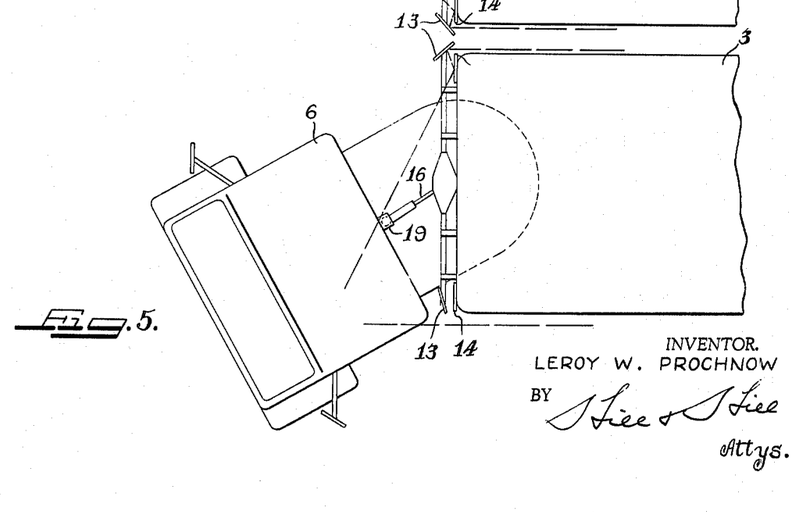

Referring to FIGS. 3, 4 and 5, it will be noted that when the tractor and trailer are aligned as shown in FIG. 3, the lever 16 will be aligned with the longitudinal axis of the tractor-trailer combine and both mirrors 13 will be retracted inwardly inside the planes of the side walls of the trailer body, the mirrors approaching a parallel relation with respect to the mirrors 14 and the plane of the front wall 2 of the trailer. As indicated by the broken lines, the driver thus has full operational accessibility to the conventional rear view mirror 7, his line of vision in such mirrors being unobstructed by the mirrors 13 which are retracted well out of such line of vision.

However, when the tractor is turned to the right into an angular relation with respect to the trailer, as illustrated in FIG. 4, the lever 16 will accordingly pivot the shaft 15 to move the arms 12 outwardly and with it the mirrors 13 outwardly beyond the plane of the side walls of the trailer body and will also suitably tilt the mirrors about their vertical axes to optically align the driver's line of sight as approximately indicated by the broken lines, such line extending from the cab through the rear window 23 thereof into the fixed mirrors 14 to the associated mirror 13 and thence rearwardly more or less parallel to the side wall of the trailer. It will be noted that as the position of the driver has moved inwardly toward the longitudinal axis of the trailer, his direct line of vision has been obscured with respect to both sies of the trailer and both mirror assemblies are therefore adjusted to operable positions.

On the other hand, when the tractor is turned to the left into an angular position with respect to the trailer, as illustrated in FIG. 5, the lever 16 will pivot the shaft 15 in the opposite direction. The mirror shifting mechanism is so constructed that such movement of the lever 16 will adjust only the right hand mirror 13 as the movement of the tractor relative to the trailer has shifted the driver's position further to the left of the longitudinal axis of the tractor whereby the driver is presented with a satisfactory direct line of vision along the left side of the trailer.

Thus the driver is provided with adequate vision for all positions of the tractor and trailer so that the driver has effective vision rearwardly at all times.

Actuating mechanism

Figure 12:
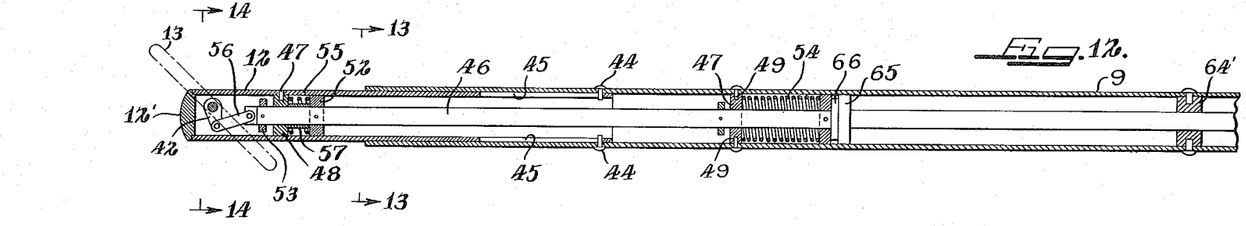
FIG. 12 is a longitudinal sectional view similar to FIG. 11 illustrating the relationship of the parts when the tractor is turned to the right and corresponding to the relationship of the parts illustrated in FIG. 10.
Figure 13:
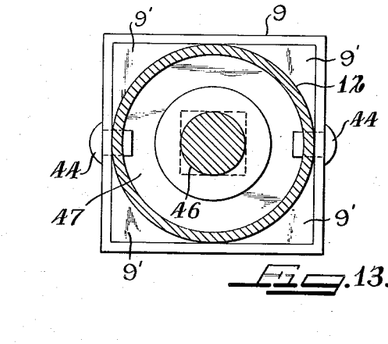
FIG. 13 is a transverse sectional view taken approximately on the line 13—13 of FIG. 12.
Figure 14:
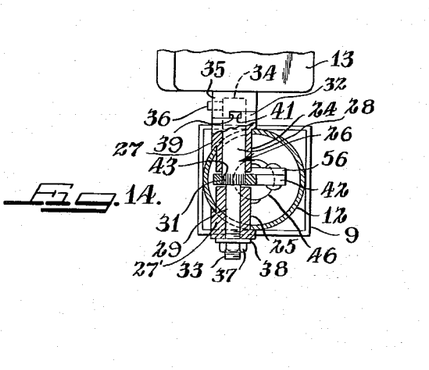
FIG. 14 is a transverse sectional view taken approximately on the line 14—14 of FIG. 12.

As illustrated in FIGS. 11, 12, 13 and 14, each mirror 13 is pivotally mounted on the associated supporting arm 12, the end of the arm being provided with a pair of sleeves 24 and 25 aligned on a vertical axis and adapted to receive a mirror supporting shaft 26. the sleeves being provided with outer flanged sleeves 27 and 27', FIG. 14, complementally shaped to the outer curvature of the arm 12, which is cylindrical in shape. The shaft 26 is provided with an upper portion 28 of relatively large diameter and a lower portion 29 of smaller diameter connected by an intermediate splined portion 31, the upper end of the shaft being provided with an enlarged collar 32 and the lower end being threaded as indicated at 33 with the bores of the sleeves 24 and 25 having diameters respectively corresponding to those of the portion 28 and 29 of the shaft. Extending upwardly from the collar 32 is a cylindrical stud 34 adapted to enter a bore in the base 35 of the mirror 13, the latter being locked in any desired position of adjustment with respect to the shaft by a lock screw 36. To restrict pivotal movement of the shaft 26, which is secured in the outer flanged sleeves 27 and 27' by a nut 37 threaded on the portion 33 of the shaft 26, a washer 38 being interposed between the nut and the adjacent face of the outer flanged sleeve 27', the outer flanged sleeve 27 and base 35 and collar 32 may be provided with cooperable offset portions 39 and 41 which are so proportioned that adequate movement of the shaft is permitted to provide for a full range of adjustment of the mirror throughout its operative positions.

The shaft 26 and with it the mirror is adapted to be pivoted on the shaft axis by a lever 42 having a complementally splined bore 43 adapted to receive and rigidly lock the splined portion 31 of the shaft to the lever.

Figure 11:
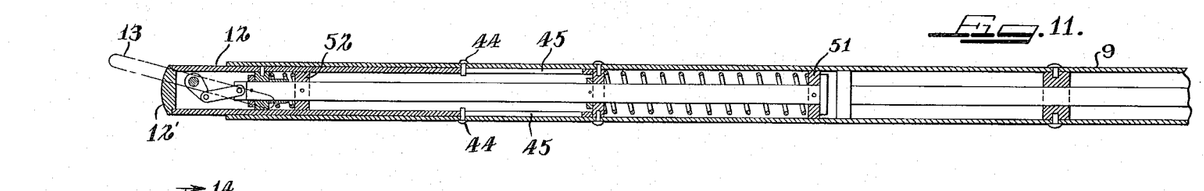
FIG. 11 is a longitudinal sectional view through one of the mirror supporting arms or members, the parts positioned in corresponding relation to those illustrated in FIG. 8.

As illustrated in FIGS. 11 and 12, the tubular arm 12 is slidable in the member 9 which, as illustrated in FIGS. 13 and 14, is of rectangular cross section, movement between the arm being limited by rivets or studs 44 carried by and extending through the slide walls of the member 9 and disposed in longitudinally extending slots 45 in the arm 12, whereby rotational movement between the parts is prevented and axial movement therebetween is limited to the length of the slots 45.

Slidable in the parts 9 and 12 is an actuating rod 46, illustrated in FIGS. 13 and 14 as being of cylindrical cross section, the rod being slidable in a fixed annular guide 47 carried by the member 9 and a similar guide 48 carried by the arm 12, the guide members being rigidly secured to their supporting elements by suitable means such as pins or rivets 49. Rigidly mounted on the rod 46 are collars 51, 52 and 53, suitably secured to the rod by pins or other means, the collar 53 forming a stop for limiting the inward movement of the rod 46, while interposed between the collar 51 and guide 47 is a compression spring 54 operative to urge the rod 46 in an inward direction and in like manner disposed between the collar 52 and the guide 48 is a compression spring 55. The lever 42 is operatively connected to the adjacent end of the actuating rod 46 by a link 56 pivotally connected at one end to the outer end of the lever 42 and disposed at the opposite end in a slot formed in the end of the rod. If desired, outward movement of the rod 46 with respect to the arm 12 may be limited by suitable means such as a sleeve 57 disposed between the collar 52 and guide member 48 which is of a length to stop relative outward movement of the rod 46 with respect to the member 12 when the mirror 13 has been rotated through a desired arc by means of the link 56. The end of each member 12 is closed by a suitable end cap 12', while the corner portions at the end of the member 9 are closed by suitable members 9'.

Figure 8:
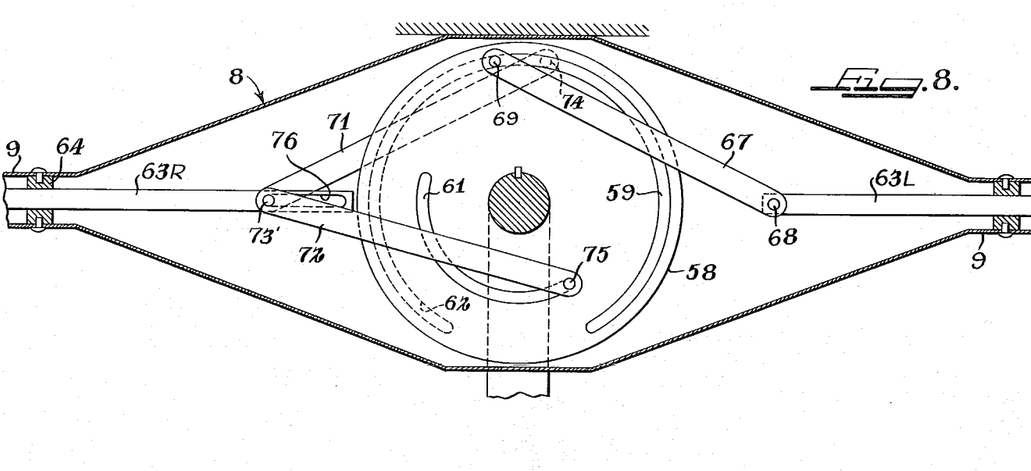
FIG. 8 is a sectional view taken approximately on the line 8—8 of FIG. 7 and illustrating the parts in normal position when the trailer and tractor are in aligned relationship.

As illustrated in FIGS. 7 through 10, disposed within the housing 8 and rigidly keyed to the pivotal shaft 15 is an actuating member or disk 58 which is provided with three slots 59, 61 and 62, the slots 59 and 61 being disposed upon the top face of the disk as illustrated in FIG. 8 and the slot 62 being disposed in the bottom face of the disk.

Slidable in the members 9 and extending into the body structure 8 are actuating rods 63R and 63L, indicating respectively the right and left hand rods relative to the sides of a trailer on which the device may be mounted. Each rod is slidable in a pair of guide collars 64 and 64' rigidly carried by the associated member 9, the outer end of each rod terminating in a head portion 65 which is generally complemental in shape to the interior of the member 9 and adapted to bear on a head 66 formed on the inner end of the associated rod 46. The rod 63L is operatively connected to the disk 58 through a connecting member or link 67 which is pivotally connected to the adjacent end of the rod 63L at one end and at the opposite end is provided with a pin 69 which is adapted to ride in the slot 59 in the disk. In like manner the rod 63R is operatively connected to the disk 58 through a pair of members or links 71 and 72 connected at their adjacent ends by respective pivot pins 73 and 73' to the rod 63R and at their opposite ends are provided with respective pins 74 and 75 adapted to be operatively disposed in the slot 62 and 61, respectively. The pins 73 and 73' are adapted to ride in a longitudinally extending slot 76 in the adjacent end of the rod 63R to provide for a suitable amount of lost motion between the adjacent ends of the arms 71 and 72, as will be apparent from a reference to FIGS. 9 and 10.

Operation of the device

Figure 6:
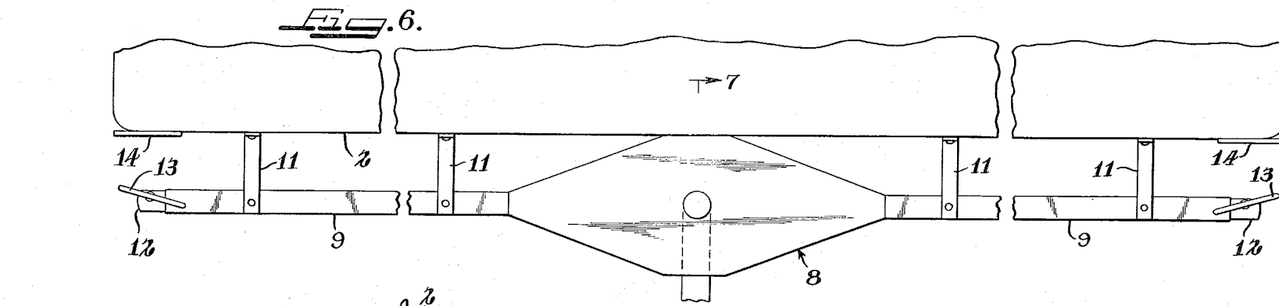
FIG. 6 is a top plan view of the mirror structure illustrating details of mounting thereof on the trailer body.
Figure 7:
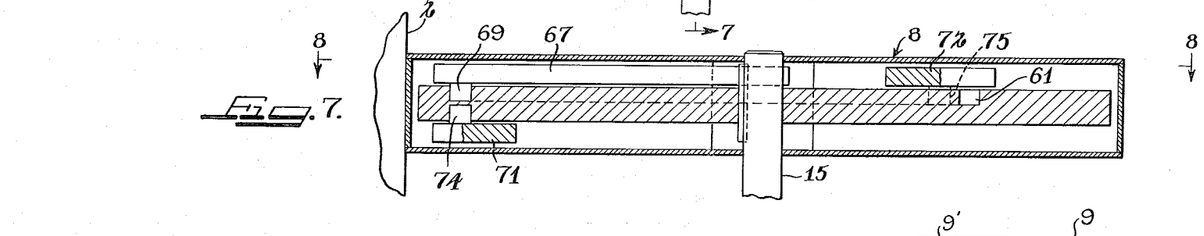
FIG. 7 is a transverse sectional view taken approximately on the line 7—7 of FIG. 6.

In operation, assuming the trailer is connected to the tractor, as illustrated in FIGS. 1, 3, 4 and 5, and the combine is in aligned relation as illustrated in FIG. 3, the actuating lever or member 16 will be aligned with the longitudinal axis of the tractor and trailer. In such position the arms 12 and mirrors 13 will be retracted as illustrated in FIG. 6, the actuating disc 58 and associated linkage being in the position illustrated in FIG. 8 and the connecting linkage to the arms 12 being in retracted position, such as illustrated in FIG. 11. As indicated in FIG. 3 by the broken lines, the driver in the cab 6 will have, through properly adjusted mirrors 7, a clear line of vision along both sides of the trailer from his driver's seat, the mirrors being substantially at the inner side of the planes of the respective side walls whereby such mirrors will not impede vision through the mirrors 7.

Assuming the tractor is turned to the right, as illustrated in FIG. 4, the position of the driver will be shifted laterally inward toward the longitudinal axis of the trailer whereby he has no direct view along either side of the trailer, and the mirrors 7 will be at undesirable angles, incapable of reflecting suitable images at either side of the trailer. It might be pointed out that where mirrors, adjustable by the turning of the tractor wheels are employed in place of the mirrors 7, neither mirror would necessarily be properly adjusted as the adjustment of the mirror would be determined by the position of the front wheels, and not the relative positions of the tractor and trailer. Likewise, in any event, with the relationship as illustrated in FIG. 4, only the right hand mirror could be operable and even then, as the wheels would be turned during maneuvering of the tractor and trailer, the field of vision would be constantly changing with such turning of the wheels.

Figure 10:
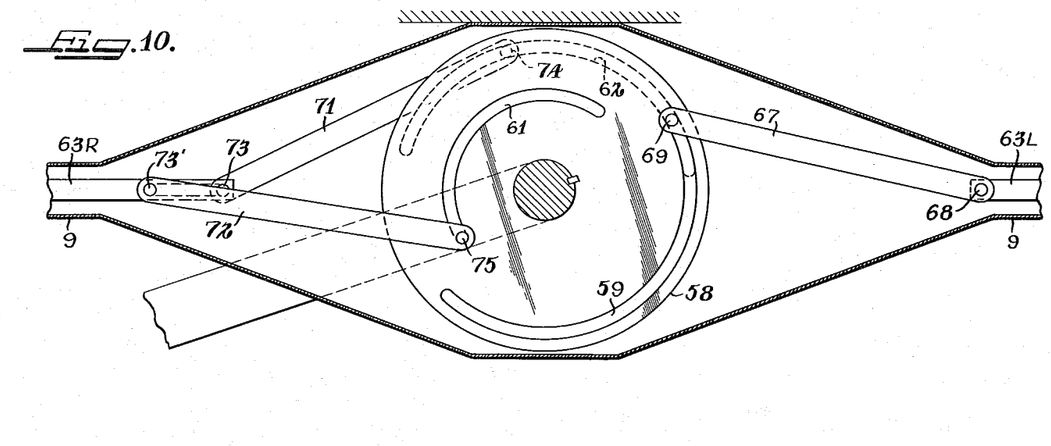
FIG. 10 is a view similar to FIGS. 8 and 9 illustrating the relationship of the parts when the tractor is turned to the right relative to the trailer.

However, with the present invention, as the tractor moves into an angular position to the right with respect to the trailer, the actuating member 16 is likewise pivoted to the right in the direction illustrated in FIG. 10, which will rotate the disc 58 in a clockwise direction and transmit outward movement to the rods 63R and 46. As the rod 63R moves outwardly from the position illustrated in FIG. 11, the first action will be the transmittal of movement from the rod 63R to the rod 46, which in turn will transmit such movement through the spring 55 to the guide sleeve 48 and thus to the arm member or arm 12, moving the latter axially outward and simultaneously therewith compressing the spring 54. Such movement will continue until the inner end of the member 12 at the slots 45 engage the pins or rivets 44 which are operative to restrict further relative movement between the arm 12 and associated portion 9. Further outward movement of the rods 63R and 46 will result in additional compression of the spring 54 and simultaneously therewith compression of the spring 55, as the arm 12 is no longer free to follow outward movement of the rod 46. Such additional movement of the rod 46 will be transmitted through the link 56 to the arm 42 and thus to the mirror 13 to rotate the latter to an operative position such as illustrated in FIG. 4, wherein the driver will have a view along the right side of the trailer, such a view being a reflected image appearing in the mirror 14, as reflected thereto from the mirror 13, as indicated by the broken lines in FIG. 4. Simultaneous with the outward movement of the right hand arm 12, the link 67 will also similarly move the mechanism at the left side, whereby the arm 12 thereat will be moved to an extended position, and the mirror 13 thereat tited to an angle at which the driver will have a similar line of vision reflected from the mirror 13 to the mirror 14 and thus to the cab.

In the event the tractor is turned to the left, as illustrated in FIG. 5, the right hand arm 12 and associated mirror 13 will be moved to an operative position similar to that described for FIG. 4 and illustrated in FIG. 12.

Figure 9:
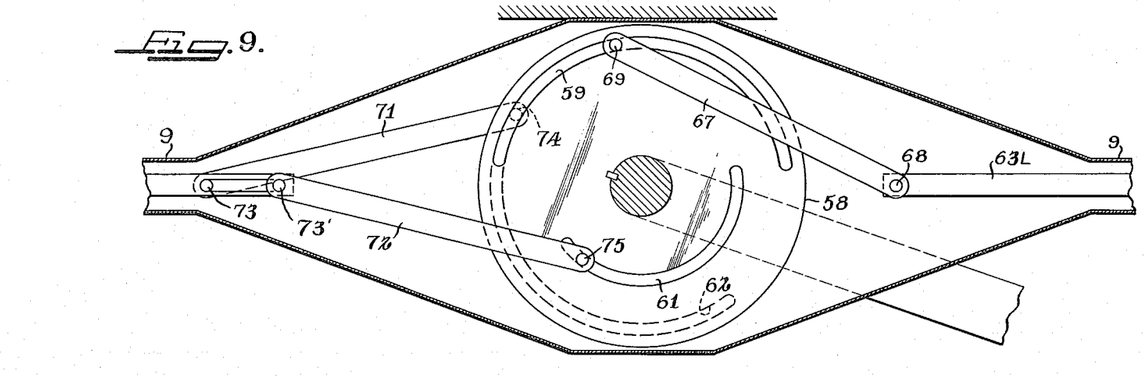
FIG. 9 is a view similar to FIG. 8 illustrating the relationship of the parts when the tractor extends angularly to the left with respect to the trailer.

However, in this case, as illustrated in FIG. 9, the links 67 and 72 are inoperative, the adjustment of the right hand mirror being accomplished through the link 71. The slot 62 and link 71 are so proportioned that counterclockwise movement of the disc 58 in response to similar movement on the part of the actuating levers 16 will maintain the right hand mirror 13 in proper adjustment for effective viewing by the driver. It will be apparent that when the tractor is turned to the left as illustrated in FIG. 5, the position of the driver is moved outwardly with respect to the longitudinal axis of the trailer and he will therefore, have a direct line of view along the left side of the trailer, as indicated by the broken line.

It will be apparent from the above that the driver is provided with adeqaute vision at all times irrespective of the relative positions of the tractor and trailer, with the structure of the present invention providing effective vision along both trailer side walls when the tractor is turned in either in a right or left hand direction. Likewise, as the mirrors of the present invention are adjustable independently of the front wheels of the tractor, the driver is able to freely turn the tractor wheel without thereby adversely affecting the operation of the mirrors 13 and 14

It will therefore be noted that in the present invention, the mirrors 13 and 14 are controlled in response to changes in angular relation between the tractor and trailer which are the controlling factors in determining the extent of the driver's vision rearwardly, as distinguished from the position of the front wheels of the tractor, which obviously have no direct or fixed bearing whatsoever on the angular relation existing between the tractor and trailer.

As previously mentioned, when the tractor is disconnected from the trailer, the ball socket connection 18–19 is first disconnected, following which the control arm may be pivoted upwardly at the connection 22, whereby such control arm is disposed adjacent the end wall of the trailer. Such connection also compensates for any angular changes vertically between the tractor and trailer.

It will be apparent from the above description that I have provided a novel rear view assembly which is very effective for the purposes intended, relatively simple and foolproof in operation and capable of ready application to existing as well as new tractor-trailer combines.

Having thus described by invention it will be obvious that various immaterial modifications may be made in the same without departing from the spirit of my invention; hence I do not wish to be understood as limiting myself to the exact form, arrangement and combination of parts or steps herein shown or described, or uses mentioned.

What I claim as new and desire to secure by Letters Patent is:

1. In a tractor-trailer arrangement, the combination of an optical reflecting system including at least a pair of mirrors carried by the trailer at the front end thereof and arranged so that light is reflected from one mirror to the other, an element of said optical reflecting system being movable from a retracted inoperable position to an extended operable position, and means operatively connecting said element and the tractor for moving such element from one position to the other in response to relative angular movement between the tractor and trailer whereby the driver of the tractor-trailer in sighting from his driving position into the optical reflecting system may sight rearwardly along a side of the trailer, depending upon the tractor relationship with respect to the trailer.

2. In a tractor-trailer arrangement, the combination of an optical reflecting system, said optical reflecting system including at least a pair of mirrors carried by the trailer and arranged so that light is reflected from one mirror to the other for viewing along the side of and to the rear of the trailer, and means operatively coupling said optical reflecting system to the tractor for transmitting angular movement between the tractor and trailer to said optical reflecting system to effect an adjustment thereof, whereby the driver of the tractor-trailer sighting from his driving position into the optical reflecting system may sight along a side of the trailer and to the rear of the trailer.

3. In a tractor-trailer arrangement as defined in claim 2, wherein of said pair of mirrors, one mirror is fixedly carried by the trailer, and the other mirror is movable and operatively connected to and adjustable by said means operatively coupling said optical reflecting system to the tractor.

4. In a tractor-trailer arrangement as defined in claim 3, wherein said means operatively coupling said optical coupling system to the tractor including slidable actuating means operatively connected to said movable mirror, whereby said movable mirror is movable from an inoperative retracted position to an operable extended position under the control of said means operatively coupling said optical reflecting system to the tractor.

5. In a tractor-trailer arrangement as defined in claim 4, wherein said movable mirror comprises shaft means permitting pivotal movement of said movable mirror about a vertical axis, said means operatively coupling said optical reflecting system to the tractor including lever means operatively connected to said means permitting pivotal movement of said movable mirror operable to pivot said movable mirror to an operative position when said movable mirror is in an extended position.

6. In a tractor-trailer arrangement, the combination of a pair of optical reflecting systems, each of said optical reflecting systems including a pair of mirrors carried by the trailer and arranged so that light is reflected from one mirror to the other for viewing along the side of and to the rear of the trailer, each optical reflecting system being adjacent a respective side of the trailer, each optical reflecting system being operative to provide for viewing rearwardly at the adjacent side of the trailer, means carried by the trailer for effecting adjustment of said optical reflecting systems and operatively connected to the tractor for operatively adjusting said optical reflecting systems in response to relative angular movement between the trailer and tractor, and said optical reflecting systems permitting the driver of the tractor-trailer sighting from his driving position into the respective optical reflecting systems to sight rearwardly along each side of the trailer upon the tractor being turned to the right and rearwardly along the right side of the trailer upon the tractor being turned to the left.

7. In a tractor-trailer arrangement as defined in claim 6, wherein one mirror of each pair is fixedly carried by the trailer contiguous to its respective side of the trailer and the other mirror of each pair is operatively connected to the aforesaid means carried by the trailer for effecting adjustment of said optical reflecting systems.

8. In a tractor-trailer arrangement as defined in claim 7, wherein the aforesaid means carried by the trailer for effecting adjustment of said optical reflecting systems is constructed to operatively adjust only the right hand optical reflecting system when the tractor is angularly turned to the left relative to the trailer, and operatively adjust both optical reflecting systems when the tractor is angularly turned to the right relative to the trailer.

9. A rear view mirror assembly for tractor-trailer trucks and the like, comprising a plurality of mirrors carried by the trailer at the forward end thereof, said mirrors assembled in pairs including a fixed and a movable mirror, said fixed mirror operatively mounted on the trailer at the front end thereof and arranged so that light may be reflected from the movable mirror to the fixed mirror in the operative position of the movable mirror extended beyond its respective side of the trailer, means for adjusting the relationship of at least one of said pairs of mirrors including said fixed and movable mirrors from an inoperative position when the truck and trailer are in aligned relation to an operative position when the tractor is disposed at an angle to the trailer, said means including linkage operatively connected to the tractor and responsive to the change in the angular relation between the tractor and trailer, whereby the driver of the tractor-trailer sighting from his driving position into the rear view mirror assembly may see rearwardly along each side of the trailer upon the tractor being turned to the right and rearwardly along the right side of the trailer upon the tractor being turned to the left.

10. As an article of manufacture, a mirror assembly for installation on tractor-trailer combinations and the like comprising fixed mirrors adapted to be operatively mounted at the front of the trailer and contiguous to the side edges of the trailer, said mirror assembly comprising an elongated body structure constructed for mounting on the front end of a trailer in operative relationship to the fixed mirrors on the trailer, a right hand mirror and a left hand mirror supported at the respective right and left hand ends of said elongated body structure for movement on a vertical axis, said right and left hand mirrors operatively arranged with respect to the respective fixed mirrors so that light may be reflected from the fixed mirrors to the respective right and left hand mirrors, and means including a tractor-engageable element including detachable means complementally formed to receiving means adapted for operatively mounting on the tractor for moving said right and left hand mirrors responsive to predetermined angular movement of said tractor-engageable element upon said detachable means being operatively connected to the receiving means affixed to the tractor of a tractor-trailer combination, whereby predetermined angular movement of the tractor with respect to the trailer permits angular adjustment of the movable mirrors so that only the right hand movable mirror is adjusted when the tractor is angularly turned to the left relative to the trailer, and operatively adjustable both right and left hand movable mirrors when the tractor is turned to the right relative to the trailer, whereby the driver of the tractor-trailer from his driving position and also sighting into the mirror assembly may see along each side of the trailer and to the rear thereof upon the tractor being turned to the right and to the left relative to the trailer.

11. A rear view mirror assembly for tractor-trailer trucks and the like and said tractor comprising a tractor cab and said trailer comprising a trailer body, said rear view mirror assembly comprising an elongated body structure disposed horizontally across the front end of the trailer, a pair of fixed mirrors carried by the trailer body and disposed substantially parallel to the front wall of the trailer body and contiguous to the side walls thereof, a pair of mirror-supporting members slidably mounted for movement in a longitudinal direction relative to said body structure and disposed at the ends of the latter, a mirror carried by each mirror supporting member adjacent the outer end thereof for movement about a vertical axis, a pivotally movable actuating member operatively related to said body structure, means for operatively connecting said pivotally movable actuating member with said tractor of a tractor-trailer truck and operative to translate angular movement between the trailer and tractor into pivotal movement of said pivotally movable actuating member, means operatively connecting said pivotally movable actuating member with said slidably mounted mirror supporting members for selectively extending the slidably mounted mirror supporting members relative to said body structure responsive to such movement of the pivotally movable actuating member and extending the associated mirror laterally outward beyond the trailer side walls, each fixed mirror and contiguous mirror carried by each mirror supporting member operative for reflecting light from the fixed mirror to its respective contiguous mirror, and means operatively connecting the mirror supporting member and the pivotally movable actuating member for rotating an extended mirror on its vertical axis to an operative rear viewing position by the driver within the tractor cab, whereby the driver within the tractor cab may sight from his driving position into the rear view mirror assembly along one or both sides of the trailer, depending upon the tractor relationship therewith.

12. A rear view mirror assembly for tractor-trailer trucks and the like and said trailer including a pair of fixed mirrors carried by the trailer and disposed substantially parallel to the front wall of the trailer and contiguous to the side walls thereof, comprising an elongated body structure having a pair of axially aligned, oppositely disposed tubular portions extending therefrom, said body structure disposed across the front end of a trailer with the aforesaid axially aligned oppositely disposed tubular portions extending horizontally, a pair of tubular members slidably carried in the respective tubular portions and extending from the free end thereof, cooperable means on each tubular member and associated tubular portion for limiting relative movement therebetween, a mirror for each tubular member in operative relationship with the fixed mirrors upon the rear view mirror assembly being operatively mounted on the front end of the trailer, each fixed mirror and contiguous mirror carried by each tubular member operative for reflecting light from the fixed mirror to its respective contiguous mirror, a supporting shaft for each mirror pivotally mounted on the associated tubular member adjacent the free end thereof for pivotal movement about a vertical axis, cooperable means on each mirror and the associated shaft for rigidly connecting the same, an actuating rod disposed in each tubular member, means operatively connecting each rod and associated mirror supporting shaft for transmitting outward movement of such rod to such shaft for effecting pivotal adjustment of the associated mirror, spring means operatively connecting each rod and associated member for resiliently transmitting outward movement of such rod to such member, spring means operatively connecting each rod and the associated tubular portion for urging such rod in an inward direction, means operatively connecting each rod and associated tubular member for transmitting inward movement of such rod thereto to normally bias said members in retracted positions, an actuating disc disposed in said body structure intermediate said tubular portions, an actuating member operatively associated with said body structure for pivotal movement about a vertical axis and rigidly connected to said actuating disc, means for operatively connecting said actuating member to a tractor for effecting pivotal movement of said actuating member in response to angular changes between such a tractor and a connected trailer on which said body structure may be installed, second actuating rods, each disposed in and movable relative to a respective tubular portion in alignment with the associated first-mentioned actuating rod and engageable therewith for operatively moving the latter outwardly, said disc having a plurality of slots therein, and a plurality of links, each having means at one end disposed in a respective slot and operatively connected at the other end to an associated second actuating rod, operative to effect movement of the associated tubular member and mirror in response to pivotal movement of said actuating member and disc, whereby upon the rear view mirror assembly being operatively mounted on the tractor of the tractor-trailer, the driver of the tractor-trailer may sight from his driving position into the rear view mirror assembly along one or both sides of the tractor depending upon the tractor relationship therewith.

13. A rear view mirror assembly as defined in claim 12, wherein said disc has three operating slots therein, the link associated with one of said slots being operatively connected to the second actuating rod associated with the tubular member which would be disposed at the left side of a trailer on which it may be installed, the links associated with the other two slots being operatively connected to the second actuating rod at the opposite side, said last mentioned links being independently connected thereto through lost motion connections, the proportions of said links, slots and connections being such that both tubular members and mirrors will be operatively extended when the actuating member is pivoted to the right and only the right hand member and mirror extended when the actuating member is pivoted to the left.

14. A rear view mirror assembly as defined in claim 12, wherein said actuating member includes a horizontally extending portion including means on the free end thereof for operative connection with cooperable means on the tractor with which is may be used.

15. A rear view mirror assembly as defined in claim 14, wherein said horizontally extending portion of the actuating member is pivotally connected with the remainder of said actuating member on a horizontal axis, said horizontally extending portion being made in two sections, which are axially extendable and retractable.

16. A rear view mirror assembly as defined in claim 14, wherein said means on the free end of the horizontally extending portion for operative connection with cooperable means on the tractor with which it may be used comprises a ball and socket connection.

No references cited.

JEWELL H. PEDERSEN, *Primary Examiner.*